३,५०३,२१०
HYDRAULIC CYLINDER ASSEMBLY
Toyoju Mochizuki, 5–10 7-chome Roppongi, and Mamoru Watanabe, 16 6-chome Takenogowa, Kitaku, both of Tokyo, Japan
Filed Jan. 13, 1969, Ser. No. 790,677
Claims priority, application Japan, Jan. 11, 1968, 43/1,198
Int. Cl. F15b 7/08, 9/00
U.S. Cl. 60—54.6    5 Claims

ABSTRACT OF THE DISCLOSURE

A hydraulic cylinder assembly of tandem type has a cylinder body with a closed end accommodating a main piston and a secondary piston, there being a primary hydraulic chamber formed in front of the main piston and in communication with the rear wheel brakes, and a secondary hydraulic chamber formed in front of the secondary piston and in communication with the front wheel brakes. A servo-motor is mounted on the rear end of the cylinder body and is coupled to the secondary piston to displace the same, and a relay piston is adapted to be normally driven by the hydraulic pressure in the primary hydraulic chamber to actuate an air pressure controller for the servo-motor, whereas in the event of any leakage of hydraulic pressure from the system of the primary hydraulic chamber the primary piston will displace freely and mechanically act on the relay piston to drive the same.

BRIEF SUMMARY OF THE INVENTION

This invention relates to a hydraulic cylinder assembly adapted for use with the brakes of automobiles.

Hydraulic cylinders, particularly master cylinders of ordinary automobile brakes are desired to meet all of the following requirements of function and construction:

(1) A power brake effect corresponding to the pedal effort of the driver must be attained, (2) For high braking efficiency and stability, hydraulic power must be distributed to the front and rear wheels of the vehicle in proportion to the respective axial loads, (3) For added safety against leakage, two independent hydraulic brake systems must be provided, (4) To save the cost and simplify the handling and installations, the means to satisfy the foregoing three functions must be formed in a single, unitary construction.

In automobiles equipped with disc brakes on the front wheels and drum brakes on the rear wheels, the disc brakes alone will ordinarily be actuated by only a slight depression of the brake pedal by the driver. In an effort to obviate this deficiency, a metering valve is usually provided between the conduits to the front brakes so that the hydraulic pressure can be sufficiently controlled for simultaneous application of the front and rear brakes.

It is a primary object of the present invention to provide a hydraulic cylinder assembly which combines all of the three functions enumerated above in a single unitary structure.

Another object of the invention is to provide a hydraulic cylinder assembly for automobiles fitted with disc brakes on the front wheels and drum brakes on the rear wheels, which permits simultaneous application of the brakes without the use of a metering valve.

According to this invention, a servo-motor is mounted on the rear end of the hydraulic cylinder for the traction of a secondary piston, so that a power brake effect proportional to the force exerted by the driver can be obtained. The hydraulic power can be adequately distributed to the front and rear wheels in proportion to their axial loads to attain improved braking efficiency and stability, because the stroke of the primary piston which is mechanically driven by the driver serves to supply hydraulic pressure to the rear brakes, while the stroke of the secondary piston driven by the hydraulic power produced by the primary piston and also by the tractive force of the servo-motor serves to supply hydraulic pressure to the front brakes. In addition, hydraulically independent primary and secondary hydraulic chambers are formed and engageable means such as a tongue or a taper portion on the primary piston serves for mechanically moving a relay piston in response to the free advance of the primary piston upon occurrence of any leakage from the system of the primary hydraulic chamber. Thus, two independent hydraulic brake systems are provided for an additional margin of safety against leakage of the hydraulic pressure. Further, because the servo-motor is mounted on the rear end of the hydraulic cylinder and the relay cylinder is in communication with the primary hydraulic chamber of the hydraulic cylinder, all of the essential components, i.e., the hydraulic cylinder, servo-motor, relay cylinder and the air pressure controller for the servo-motor, are integrally combined together, thus making it possible to save the cost and simplify the handling and mounting.

When the brake pedal is depressed to operate the assembly in accordance with the present invention, the pressure in the primary hydraulic chamber for the rear brakes is first increased to actuate the relay piston and servo-motor and then the pressure in the secondary hydraulic chamber for the front brakes is increased, thus causing a delay in action of the front brakes with respect to that of the rear brakes. It will therefore be appreciated, that when the hydraulic cylinder assembly of the invention is installed on an automobile equipped with disc brakes on the front wheels and drum brakes on the rear wheels, the lag in action on the front wheels according to the invention will offset the quick action of the disc brakes to insure simultaneous application of the front and rear brakes.

DETAILED DESCRIPTION

The present invention will now be described in conjunction with the accompanying drawings showing embodiments thereof.

Figure 1:
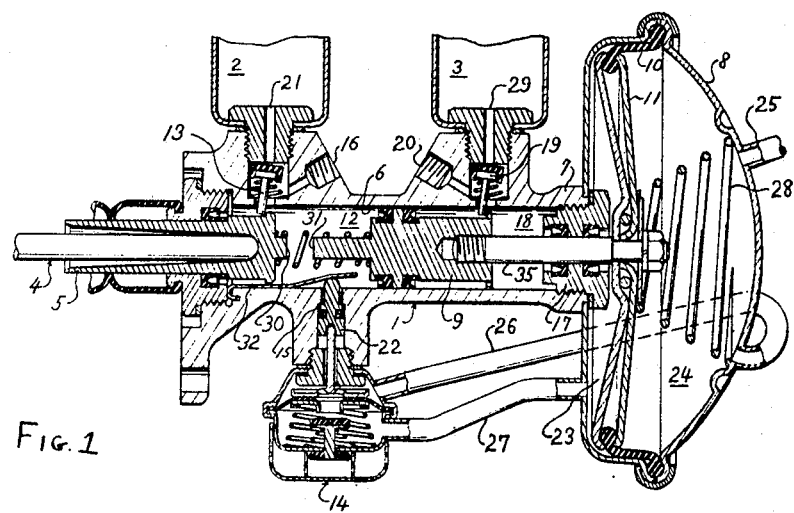
FIGURE 1 is a sectional view of a hydraulic cylinder assembly embodying the present invention.

In the embodiment shown in FIG. 1, a hydraulic cylinder body generally indicated at 1 is provided with two reservoirs 2 and 3 on the upper part thereof. In the base of a hydraulic cylinder 6, there is fitted a primary piston 5 which is adapted to be driven via a push rod 4 by the driver. In the middle of the cylinder 6 is accommodated a secondary piston 9 which is driven by a servo-motor 8 coupled to the rear end 7 of the cylinder. The secondary piston 9 is linked with diaphragm 10 and actuating member 11 of the servo-motor 8 by a pull rod 35. Between the primary piston 5 and secondary piston 9 there is defined a primary hydraulic chamber 12, which is in communication with the reservoir 2 thereabove through a tilting valve 13 and a passage 21. The chamber 12 is also in communication with a relay cylinder 15 housing a relay piston 22 for driving an air pressure controller 14 for the servo-motor 8, and further with a hydraulic pressure outlet 16 for the rear brakes. Between the secondary piston 9 and a nut 17 of the rear end 7 of the cylinder, there is defined a secondary hydraulic chamber 18. This chamber is in communication, via tilting valve 19 and a passage 29, with the reservoir 3 and the chamber 18 is also in communication with a hydraulic pressure outlet 20 for the front brakes, but it is isolated from the relay cylinder 15.

In the servo-motor 8, two air pressure chambers 23, 24 are separated from each other by the diaphragm 10 and the actuating member 11 and the chambers 23, 24 are evacuated before the application of the brakes by an intake mechanism, such as the intake manifold of the engine, through vacuum hoses 25, 26, 27. The diaphragm 10 and the actuating member 11 are urged by spring 28 towards the hydraulic cylinder 6.

Primary piston 5 is formed with a head 30 facing a mechanical plunger protrusion 31 of the secondary piston 9. Inside the primary hydraulic chamber 12 is an elastic tongue 32 in contact with the upper end of the relay piston 22.

If a force is exerted by the driver to push the push rod 4, thereby to actuate the primary piston 5 (and displace the same to the right in FIG. 1), the passage 21 providing communication between the primary hydraulic chamber 12 and the reservoir 2 is closed because the primary piston 5 moves away from the tilting valve 13. As a result, the hydraulic pressure in the primary hydraulic chamber 12 is applied against the secondary piston 9 and the relay piston 22 in the relay cylinder 15, thereby to act on the brake cylinders for the rear wheels in communication with the hydraulic pressure outlet 16.

As the secondary piston 9 begins moving to the right under the action of the hydraulic pressure generated in the primary chamber 12, the tilting valve 19 closes the passage 29 which provided communication between the secondary hydraulic chamber 18 with the reservoir 3. At the same time, the relay piston 22 is displaced by the hydraulic pressure from the primary chamber 12 to actuate the air pressure controller 14 so as to introduce atmospheric pressure into the air pressure chamber 23. Accordingly, the diaphragm 10 and the actuating member 11 act through the pull rod 35 to draw the secondary piston 9 to the right. Secondary piston 9 then compresses the fluid in secondary hydraulic chamber 18. The pressure in chamber 18 is applied to the front brakes via outlet 20. This pressure represents the sum of the hydraulic power of the primary hydraulic chamber 12 to which the rear part of the secondary piston 9, or the portion of the piston opposite to the primary piston 5 is subjected, and the tractive force exerted by the servo-motor 8. Consequently, the hydraulic pressure transmitted from the secondary hydraulic chamber 18 to the front brakes becomes higher than that from the primary hydraulic chamber 12.

In the manner as described, it is possible to achieve adequate distribution of hydraulic power between the front and rear brakes, when the load on the front axle is increased and the load on the rear axle is decreased by the inertia force generated upon the brake application as is usually the case with most automobiles. Thus, the assembly according to the invention eliminates the necessity for limit valves, pressure control valves, or the like, which are usually fitted between the tubing from a conventional hydraulic cylinder to the rear brakes, thereby to limit the hydraulic pressure applied to the rear brakes.

In the foregoing description, it has been shown that the hydraulic cylinder assembly of the invention has a brake effect proportional to the force exerted by the driver in depressing the brake pedal, and the assembly can regulate the hydraulic pressures applied to the front and rear brakes in correspondence with the axial loads on the respective axles. Moreover, the hydraulic cylinder is assembled as a unitary construction which is rugged, free of troubles, and convenient for installation.

Next will be described the construction by which leakage of the two hydraulic brake systems is prevented, according to the invention.

If any leakage of fluid under pressure occurs in the system of the primary hydraulic chamber 12 and rear brakes, the primary piston 5, when forced by the push rod 4, is freely displaced during a loss stroke until the head 30 contacts the protrusion 31 of the secondary piston 9, to thereby displace the secondary piston 9. At this point, the tongue 32 located along the inner wall of the hydraulic cylinder 6 for actuating the relay piston 22 is mechanically depressed by the primary piston 30 and it accordingly urges the relay piston 22 downward to operate the air pressure controller 14. With such an arrangement, the secondary piston 9 is displaced by the operation of the servo-motor 8 to supply the hydraulic pressure fluid to the front brakes to attain the purpose of braking without being hindered in any way by the disruption of the rear brake system.

On the other hand, if any leakage takes place in the system of the secondary hydraulic chamber 18 and the front brakes, the secondary piston 9 is brought into contact with the nut 17 at the rear end portion 7 of the cylinder, both by the tractive force of the servo-motor 8 and the fluid pressure in the primary hydraulic chamber 12 generated by the stroke of the primary piston 5. The hydraulic pressure from the primary chamber 12 thus acts on the rear brakes. In this case, the rear brake system is operated in proportion to the force exerted by the driver on the brake pedal, independently of the power brake function of the servo-motor 8, and therefore the danger of supply of excessive hydraulic pressure, to cause locking of the rear wheel brakes, is prevented.

Figure 2:
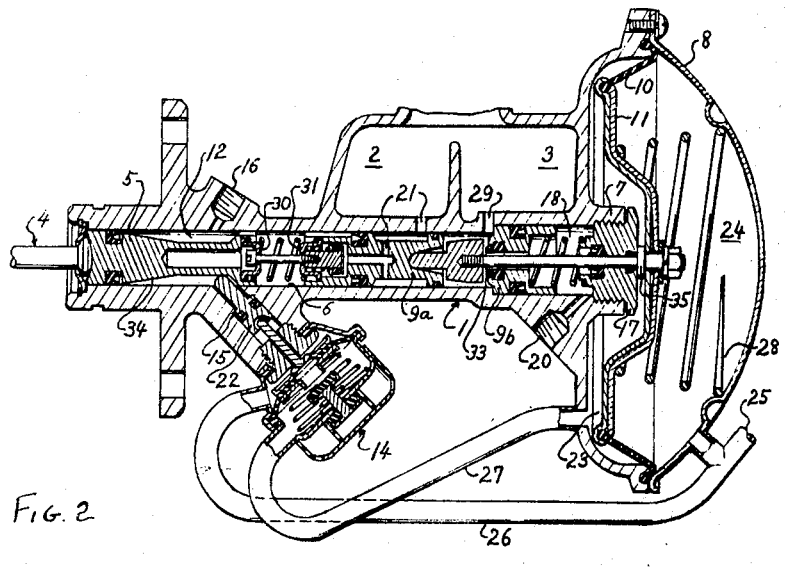
FIGURE 2 is a sectional view of another embodiment of hydraulic cylinder assembly of the invention.

The embodiment of the present invention as illustrated in FIG. 2 is a modification of that shown in FIG. 1. Like parts having the same functions as in the embodiment of FIG. 1 are designated by like numerals. Here the secondary piston consists of two members $9a$, $9b$, with a valve 33 interposed therebetween for shutting off or establishing communication between the reservoir 3 and the secondary hydraulic chamber 18. Primary piston 5 is formed with a taper portion 34 for slidably urging the relay piston 22 downward. Accordingly, if a leakage occurs in the system communicating the primary hydraulic chamber 12 with the rear brakes, the taper portion 34 presses the upper end of the relay piston 22 as the primary piston 5 undergoes its free stroke, and the relay piston 22 in turn actuates the air pressure controller 14.

It is to be understood that the servo-motor according to the invention is not restricted to that of the diaphragm type but a piston type may be employed as well.

What is claimed is:

1. A hydraulic cylinder assembly for controlling front and rear brakes, said assembly comprising a cylinder body having a closed end, a primary piston slidably mounted in the cylinder body and adapted to be displaced during a braking operation, a servo-motor mounted on the cylinder body, a secondary piston located in said cylinder body between the closed end thereof and the primary piston and coupled to said servo-motor for being displaced thereby, said primary and secondary pistons defining a primary hydraulic chamber therebetween which is in communication with the rear brakes, said secondary piston and the closed end of the hydraulic cylinder defining a secondary hydraulic chamber which is in communication with the front brakes, a relay cylinder in communication with the primary hydraulic chamber, a relay piston accommodated in the relay cylinder for being normally actuated by the hydraulic pressure in the primary hydraulic chamber thereby to operate the servo-motor, and engageable means for mechanically actuating the relay piston in proportion to the advance of the primary piston if any leakage of hydraulic pressure occurs in the primary hydraulic chamber and rear brakes.

2. A hydraulic cylinder according to claim 1, wherein said engageable means is a tongue located in the primary hydraulic chamber and positioned to be slidingly moved to depress the relay piston upon advance of the primary piston.

3. A hydraulic cylinder assembly according to claim 1, wherein said engageable means comprises a taper portion formed integrally with the primary piston and positioned to depress the relay piston upon the advance of the primary piston.

4. A hydraulic cylinder assembly according to claim 1, comprising an air controller coupled to said servo-motor for actuating the same, said relay piston being engageable with said air controller to activate the same and thereby operate the servo-motor.

5. A hydraulic cylinder assembly according to claim 1, wherein said secondary piston comprises first and second members, the secondary hydraulic chamber being between said second member and said closed end of the cylinder body, said assembly further comprising an accumulator in communication with said secondary hydraulic chamber and valve means between said first and second members for selectively interrupting communication between the secondary hydraulic chamber and said accumulator when the secondary piston is acted on by the servo-motor.

References Cited
UNITED STATES PATENTS

| | | |
|---|---|---|
| 2,875,582 | 3/1959 | Hill. |
| 3,103,786 | 9/1963 | Hager. |
| 3,208,223 | 9/1965 | Watanabe. |
| 3,237,411 | 3/1966 | Taft. |

MARTIN P. SCHWADRON, Primary Examiner

R. R. BUNEVICH, Assistant Examiner

U.S. Cl. X.R.

60—54.5